Oct. 15, 1940.        L. MORICICH        2,218,290
TOOTH PASTE DISPENSER
Filed March 7, 1939
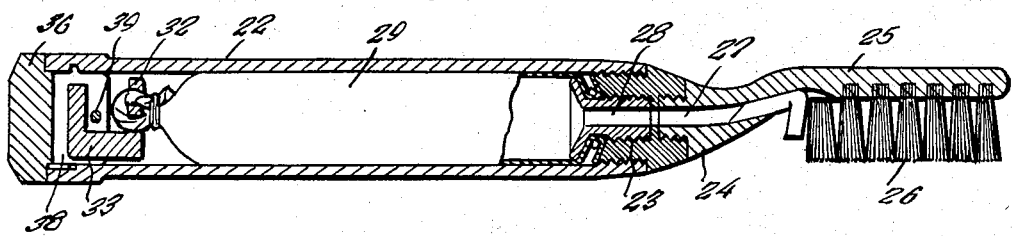
Fig. 1.
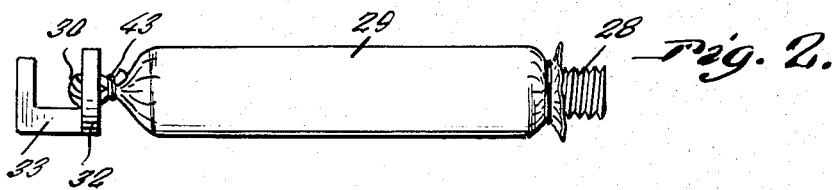
Fig. 2.
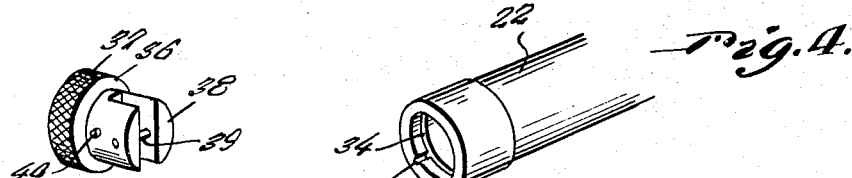
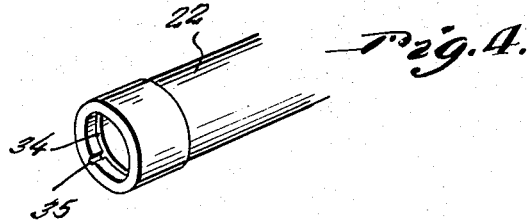
Fig. 3.    Fig. 4.
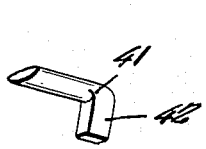    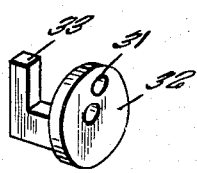    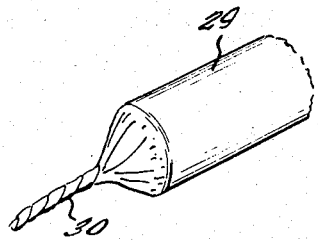
Fig. 5.    Fig. 6.    Fig. 7.
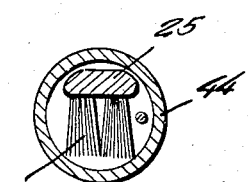
Fig. 13.
Inventor
Lucas Moricich
By Clarence A. O'Brien
and Hyman Berman
Attorneys Patented Oct. 15, 1940

2,218,290

UNITED STATES PATENT OFFICE 2,218,290

TOOTH PASTE DISPENSER

Lucas Moricich, Avalon, Calif.

Application March 7, 1939, Serial No. 260,390

2 Claims. (Cl. 221—60)

This invention relates to tooth paste dispensers and has for the primary object the provision of a sanitary and inexpensive device of this character which is extremely simple in construction and easy to use and has readily accessible tooth-cleaning material which may be applied to the bristles of an attached brush as needed and may be conveniently carried within a pocket of a garment when not in use.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a longitudinal sectional view illustrating my invention wherein dental cream may be stored in the handle and dispensed to the bristles as desired.

Figure 2 is a side elevation illustrating the container for the dental cream and its connection with an operating cap on the handle of the tooth brush.

Figure 3 is a perspective view illustrating the operating cap.

Figure 4 is a fragmentary perspective view illustrating one end of the handle.

Figure 5 is a perspective view illustrating a closure plug.

Figure 6 is a perspective view illustrating the connecting element between the dental cream container and the operating cap.

Figure 7 is a fragmentary perspective view illustrating one end of the dental cream container.

Referring in detail to the drawing, the handle is indicated by the character 22 and is of tubular formation having one end internally screw threaded to receive the screw threaded outlet fitting 23 in which is threaded a shank 24 of a brush head 25. Tufts of tooth brush bristles 26 are applied to the head 25 and the shank of said head has a passage 27 extending through the screw threaded end thereof and partway into the head 25. The end of the passage located in the screw threaded end of the shank is screw threaded to receive a screw threaded discharge neck 28 of a dental cream container 29.

The container 29 is in the form of a bag suitably secured on the discharge neck 28 and has its opposite end twisted, as shown at 30. The container 29, as before stated, is in the form of a bag constructed of collapsible material of a durable quality. The twisted end 30 of the container 29 is adapted to be passed through or laced through openings 31 of a disc 32. It is to be understood that the container 29 is arranged in the handle 22 and the disc 32 is of a diameter to move freely within the handle and has formed thereon a hook 33.

One end of the handle has an internal groove 34 and oppositely arranged grooves 35 which communicate with the groove 34 and extend through the end of the handle. The groove 34 is of annular formation.

A closure cap or plug 36 having knurled face 37 is provided with a bifurcated portion 38 adapted to extend into the handle on the application of the plug to said handle. The bifurcated portion is connected with a pin 39 for the hook 33 to engage with, it being understood that the hook is positioned between the bifurcated portion, as shown in Figure 1. Lugs 40 are arranged on opposite sides of the bifurcated portion and are adapted to enter the groove 34 by way of the grooves 35 on the application of the plug to the handle and on entering the groove 34 will permit the plug to rotate relative to the handle without being detached therefrom.

To dispense the dental cream from the container 29 onto the bristles the plug is rotated bringing about twisting of the container 29 to collapse the same and thereby force the contents through the passage 27 to the bristles.

When the tooth brush is not in use the passage 27 may be closed by a plug 41 having an offset finger piece 42 to facilitate the insertion and removal of the plug from the passage 27.

It is to be understood that the dental cream is to be sold in the collapsible container 29 having a suitable cap applied to the discharge neck 28 and when it is necessary to replenish the supply of dental cream in the handle of the tooth brush it is only necessary to remove the empty container and insert in the handle in lieu thereof a completely filled container. The connection of the container with the shank of the brush head is by the screw threaded discharge neck which permits the container to be easily moved and applied when desired.

It is a very simple matter to secure the twisted end of the container through the openings of the disc 32 and after the passing of the twisted end through said openings it may be tied, as shown at 43. The disc and the hook 33 thereof provides a very simple arrangement for the easy attachment of the container to the closure plug 36.

The application of the plug 36 to the handle 22 is easily carried out by the movement of the lugs 40 in the grooves 35.

It is believed that the simplicity and advantages of this invention will be apparent to those skilled in the art to which such device relates and while I have herein set forth a satisfactory embodiment of the invention, it is to be understood that such changes therefrom as fairly fall within the scope of my claims may be resorted to when desired.

What is claimed is:

1. In a device of the class described, a hollow holder, an outlet fitting at one end of the holder, a closure plug for the other end of the holder and rotatably and detachably connected to the latter, a collapsible container located in the holder and including a discharge neck connected to said outlet fitting, said container having a twisted end, a disc having openings to receive the twisted end of said container, and means for detachably connecting the disc to said plug.

2. In a device of the class described, a hollow holder, an outlet fitting at one end of the holder, a closure plug rotatably and detachably connected to the other end of said holder and including a bifurcated portion, a pin carried by the bifurcated portion, a collapsible container located in the holder and including a discharge neck connected to said outlet fitting, said container having a twisted end, a disc having openings to receive the twisted end of said container, and a hook formed on said disc to engage the pin within the bifurcated portion of the plug.

LUCAS MORICICH.